United States Patent
Meissner et al.

(10) Patent No.: US 10,887,659 B1
(45) Date of Patent: Jan. 5, 2021

(54) REDUNDANT PROMOTIONAL CHANNEL MULTICAST

(71) Applicant: CHARTER COMMUNICATIONS OPERATING, LLC, Saint Louis, MO (US)

(72) Inventors: Jeremy P. Meissner, Parker, CO (US); David C. Langdon, Jr., Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/529,241

(22) Filed: Aug. 1, 2019

(51) Int. Cl.
*H04N 21/6405* (2011.01)
*H04N 21/472* (2011.01)
*H04L 12/18* (2006.01)
*H04L 29/06* (2006.01)

(52) U.S. Cl.
CPC ......... *H04N 21/6405* (2013.01); *H04L 12/18* (2013.01); *H04L 65/4076* (2013.01); *H04N 21/47202* (2013.01)

(58) Field of Classification Search
CPC .......... H04N 21/6405; H04N 21/47202; H04L 12/18; H04L 65/4076
See application file for complete search history.

(56) References Cited

U.S. PATENT DOCUMENTS

| | | | | |
|---|---|---|---|---|
| 6,757,305 B1* | 6/2004 | Soepenberg | ......... | H04N 21/235 370/536 |
| 7,818,787 B2* | 10/2010 | Karaoguz | ......... | H04L 12/2832 726/3 |
| 9,026,789 B2* | 5/2015 | Brown | ................. | H04L 9/3265 713/156 |
| 2004/0247288 A1* | 12/2004 | Nam | ................. | H04N 21/4405 386/259 |
| 2005/0198097 A1* | 9/2005 | Kalnitsky | ........... | H04L 65/4069 709/200 |
| 2007/0027976 A1* | 2/2007 | Sasame | .............. | H04N 21/2405 709/223 |
| 2008/0225698 A1* | 9/2008 | Smith | ................. | H04L 12/1863 370/218 |
| 2008/0307479 A1* | 12/2008 | Jones | ................. | H04N 21/6125 725/115 |
| 2009/0254952 A1* | 10/2009 | Sridhar | .............. | H04N 21/6125 725/92 |
| 2010/0312826 A1* | 12/2010 | Sarosi | ................ | H04L 65/4084 709/203 |

(Continued)

*Primary Examiner* — Arvin Eskandarnia
(74) *Attorney, Agent, or Firm* — Armis IP Law, LLC

(57) ABSTRACT

A Video on Demand (VOD) service provides VOD offering in response to a graphical user interface (GUI) screen that renders a guide of available VOD offerings. A concurrent stream of promotional content is also rendered along with the VOD offerings, and displays various VOD offerings and advertising media, typically rendered in a screen portion adjacent the VOD guide offerings. Such promotional content is often referred to as "barker" content and is delivered over a barker channel that transmits in parallel with the VOD guide. Delivery of the VOD guide and associated barker channel content includes a redundant barker player and failover processing that identifies failed barker content transmission (streaming) and commences transmission from a standby barker player with minimal interruption to the rendered viewer experience.

23 Claims, 5 Drawing Sheets

(56) References Cited

U.S. PATENT DOCUMENTS

2013/0262693 A1\* 10/2013 Phillips .............. H04N 21/8456
709/231
2014/0172961 A1\* 6/2014 Clemmer ........... H04N 21/4307
709/203

\* cited by examiner

400 MONITOR A MULTICAST STREAM OVER WHICH A FIRST SERVER TRANSMITS A STREAM OF CONTENT DOWNSTREAM OVER A COMMUNICATION LINK TO MULTIPLE COMMUNICATION DEVICES

401 ASSIGN FIRST SERVER A SOURCE NETWORK ADDRESS FROM WHICH THE FIRST SERVER TRANSMITS THE STREAM OF CONTENT OVER THE MULTICAST LINK

402 JOIN THE MULTICAST STREAM TO MONITOR FOR PRESENCE OF THE STREAM OF CONTENT

403 COMMUNICATION DEVICES AT WHICH THE MULTICAST STREAM TERMINATES INCLUDE SETTOP BOXES, EACH OF THE SETTOP BOXES COUPLED TO A VISUAL RENDERING DEVICE OF A SUBSCRIBER FOR DISPLAY OF RENDERED CONTENT.

404 ANALYZE THE STREAM OF CONTENT TRANSMITTED FROM THE FIRST SERVER OVER THE COMMUNICATION LINK

405 ESTABLISH A SNIFFER FOR CAPTURING OUTGOING PACKETS ON THE STREAM OF CONTENT

406 RECEIVE A COPY OF THE STREAM OF CONTENT TRANSMITTED FROM THE FIRST SERVER

407 MAINTAIN A COUNT OF THE CAPTURED OUTGOING PACKETS SENT ON THE STREAM OF CONTENT.

408 COMPARING THE STREAM OF CONTENT TRANSMITTED FROM THE FIRST SERVER TO THE COPY OF THE STREAM OF CONTENT.

FIG. 4A

REDUNDANT PROMOTIONAL CHANNEL MULTICAST

BACKGROUND

Conventional content delivery networks provide media services such as television, streaming audio and Video-on-Demand (VOD). Having evolved from legacy CATV (cable TV), users now have greater control over program selections than passive broadcast viewing. For example, VOD allows individual subscribers to select programs for viewing using a graphical user interface (GUI) and search engine offered by the media services provider, often only limited by a service level of the customer/subscriber. Due to the large number of options available, program guides can be quite extensive.

Conventional program guides are typically transmitted on a dedicated channel, and are accompanied by a promotional channel that renders promotional media as a "banner" or picture-within-picture format that renders continuously while the subscriber is viewing the guide.

One conventional type of promotional channel is a barker channel. As its name suggests, a barker channel is a form of digital signage, operating in the form of a television channel that is entirely composed of sales promotion and advertising, usually marketing various features of the service carrying the channel.

BRIEF DESCRIPTION OF EMBODIMENTS

This disclosure includes the observation that media content and in particular Video-On-Demand (VOD) content is accessible to many users via a plurality of headends responsible for transmitting the streaming content, which is susceptible to failure. Typically, VOD is delivered in response to a graphical user interface (GUI) screen that renders a guide of available VOD offerings. A concurrent stream of promotional content is also rendered along with the VOD offerings, and displays various VOD offerings and advertising media, typically rendered in a screen portion adjacent the VOD guide offerings. As previously discussed, such promotional content in a barker channel is often referred to as "barker" content and is delivered over a barker channel that transmits in parallel with the VOD guide. Unfortunately, conventional approaches to VOD delivery suffer from the shortcoming that problems or interruptions in the barker channel require substantial time to restart and render the barker with promotional content. Substantial downtime or "black screen" intervals may occur for restarting the required streaming.

Embodiments herein provide novel approaches to delivering the associated barker channel content by providing a redundant barker player and automatic failover capability that identifies failed barker content transmission (streaming) and commences transmission from a standby barker player with minimal interruption to the rendered viewer experience.

More specifically, embodiments herein include a media system comprising: a plurality of servers, a monitor resource, control logic, and an interface. During operation, the servers are operable to alternately transmit a multicast stream of content downstream over a communication link to multiple communication devices. The monitor resource (service) monitors the multicast stream over which a first server transmits a stream of content downstream over the communication link to multiple communication devices. The control logic (or analyzer resource) analyzes the stream of content transmitted from the first server over the communication link. In one embodiment, the control logic, in response to detecting a failure associated with the first server transmitting the stream of content based on the analyzing of the stream of content, commences transmission of the stream of content over the multicast stream from a second server over the communication link.

In yet further embodiments, an interface to the downstream communication devices for rendering the stream of content in conjunction with a program guide channel.

Accordingly, embodiments herein include: monitoring a multicast stream over which a first server transmits a stream of content downstream over a communication link to multiple communication devices; analyzing the stream of content transmitted from the first server over the communication link, and in response to detecting a failure associated with the first server transmitting the stream of content based on the analyzing of the stream of content, transmitting the stream of content over the multicast stream from a second server over the communication link.

In yet further embodiments, the monitor resource joins the multicast stream to monitor for presence of the stream of content. In such an instance, the monitor resource receives a copy of the stream of content transmitted from the first server and determines if there are errors associated with the segment of content. For example, the monitor resource (analyzer resource) compares the stream of content (such as content in a barker channel) transmitted from the first server to the copy of the stream of content (original content transmitted in the barker channel). If the analyzer resource detects that the stream of content transmitted from the first server does not match the copy of the stream of content, the analyzer resource flags the condition as a failure or error condition.

In accordance with still further embodiments, the first server in the media system as described herein is assigned a source network address (such as a virtual network address) from which the first server transmits the stream of content over the multicast link. In response to a detected failure condition, the second server resource takes over a task of transmitting the segment of content. In such an instance, the server resource generates the stream of content from the second server to include the source network address.

Further embodiments herein include, via the analyzing, establishing a sniffer for capturing outgoing packets on the stream of content from the first server resource to one or more downstream resources. The monitor resource (analyzer resource) maintains a count of the captured outgoing packets sent on the stream of content to determine a health of the first server resource transmitting the stream of content of content.

Yet further embodiments herein include establishing the multicast stream in which the multicast stream emanates from a source network address (assigned to the first server resource). The multicast stream terminates at each of multiple downstream communication devices. Depending on which server resource is transmitting the stream of content, the first server resource or second server resource join the multicast stream to monitor a health of the other server resource transmitting the stream of content (such as a barker video file).

In a manner as previously discussed, in one embodiment, the source network address is shared by the first server and the second server such that the multicast stream has a consistent source address upon receipt by one or more downstream devices. In other words, because the same source address is used shared and transmitted by each of the server resources, a recipient device such as a respective headend joining the multicast link is not aware of a switchover between the first server resource transmitting the stream of content or the second server resource transmitting the stream of content. Thus, switchover from the first server resource (failing resource) to the second server resource is seamless.

In yet further embodiments, the headend receiving the stream of content over the multicast link transmits the content in the stream downstream in one or more QAM channels to multiple communications devices that tune to the respective one or more QAM channels to receive the stream of content.

In one embodiment, downstream devices receiving the QAM channel include one or more set top boxes; each of the set-top boxes is operated to produce a visual rendering of the stream of content on a display screen for viewing by a subscriber.

In still further embodiments, the set top boxes are adapted to receive a channel selection for directing the rendered content, the multicast stream being rendered in conjunction with a channel selection for a program guide channel.

In one embodiment, the stream of content includes a plurality of files, each of the files corresponds to a type of the communication devices defining user equipment; each type of device is adapted to receive a respective file; each file includes similar promotional content for display to a respective subscriber.

Further embodiments herein include determining a type of a set top box, and rendering the stream of content from one of a plurality of content files based on the detected type of the set top box.

Yet further embodiments herein, receiving the content at a headend or central office on an upstream side of a content distribution system; transmitting the stream of content from the headend to a downstream side of the system to multiple communications devices; and analyzing the transmissions on the downstream side of the distribution system.

In yet further embodiments, the stream of content is promotional content such as a barker file (or barker content), which is adapted for looped rendering to the multiple communication devices in conjunction with a selection guide rendering. In other words, the one or more server resources transmitting the stream of content repeatedly transmit the stream of content for continuous rendering by downstream playback devices.

In another embodiment, the promotional content in the stream of content is licensed content. Further embodiments herein include commencing a loop of monitoring the promotional content in which a monitor resource verifies a current license for the promotional content. Upon verification of the license and determining a license renewal is needed, embodiments herein include continuing with the rendering and logging a notification for license renewal to one or more recipients.

Further embodiments herein include invoking a packet sniffer for capturing the stream of content emanating from the first server; and analyzing the captured packets to determine proper rendering of the stream of content.

As previously discussed, detection of a failure of transmitting the stream of content from the first server resource can be detected in any suitable manner. For example, in one embodiment, embodiments herein include, via analyzing the stream of content, counting the packets in the multicast link to identify downstream transmission of the content, and concluding a server resource failure condition (e.g., barker player failure) if no packets are emanating downstream from the first server resource over the mcl.

Note that any of the resources as discussed herein can include one or more computerized devices, wireless access points, wireless base stations, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by computer processor hardware, cause the computer processor hardware (such as one or more co-located or disparately processor devices) to: monitor a multicast stream over which a first server transmits a stream of content downstream over a communication link to multiple communication devices; analyze the stream of content transmitted from the first server over the communication link, and in response to detecting a failure associated with the first server transmitting the stream of content based on the analyzing of the stream of content, transmit the stream of content over the multicast stream from a second server over the communication link.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different wireless services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIGS. 4A-4B represent a flowchart of media file delivery and rendering according to FIGS. 2 and 3 according to embodiments herein.

Figure 1:
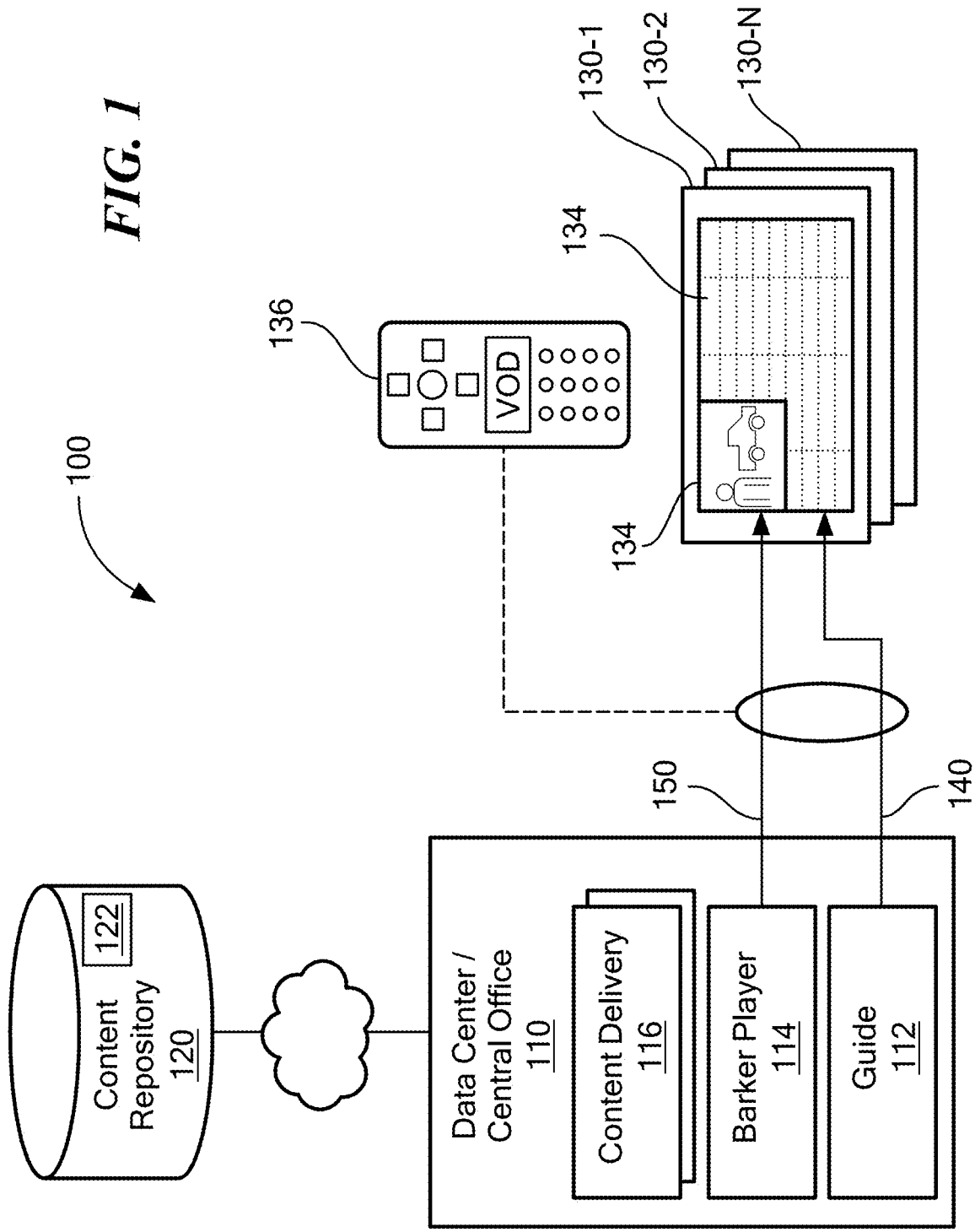
FIG. 1 is a context diagram of a media content rendering environment suitable for use with configurations herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a media content provider system offers menu selected Video-on-Demand (VOD) services to subscribers via a content delivery network including the Internet and service provider hardware such as headends and set top boxes. In one embodiment, the VOD menu is rendered along with a promotional content stream from a media file (such as a so-called "barker" file) that plays in a loop on a portion of a display screen (such as via picture in picture) while the remainder of the display screen renders a guide including menu options for VOD delivery. Configurations herein disclose a failover approach in which failure or interruption of a barker player is quickly detected and a standby or secondary server resource (such as a secondary) barker player invoked to provide a seamless or near seamless rendering experience for the observing user.

FIG. 1 is a context diagram of a media content rendering environment 100 suitable for use with configurations herein.

A data center or central office 110 initiates the streamed content that defines the VOD services. Content is stored in a repository 120 accessible from the data center 110.

At respective downstream locations in a network, a plurality of users operate one or more rendering devices, typically television screens 130-1 . . . 130-Network (display screens), for viewing a guide 132 of available VOD selections. Also rendered with the guide 132 is a screen portion 134 (display region on a respective display screen) rendering content from a barker file 122 (i.e., a media file of video content streamed for playback by one or more downstream devices).

In one embodiment, the barker file is typically rendered in a corner or side portion where it does not interfere with the guide 132 selections. A remote control device 136 is employed for selecting the VOD guide channel 140, which also invokes simultaneous streaming of the barker channel 150. Thus, when a user selects a guide for viewing on a respective display screen, a portion of the display screen is populated with a stream of content (such as barker file 122) communicated by the barker player 114 (one or more server resources).

Responsive to a command from the remote control device 136, a server or player 116 at the data center 110 transmits requested channels of content based on the requested content. Further in this example embodiment, a guide player 112 transmits the stream (data) for rendering the guide 132 on a display screen; barker player 114 transmits the barker channel 150 over which the media file (stream of content associated with the barker file 122) is transmitted.

Note that other players 116 may transmit other streams, such as VOD selections from the guide.

Figure 2:
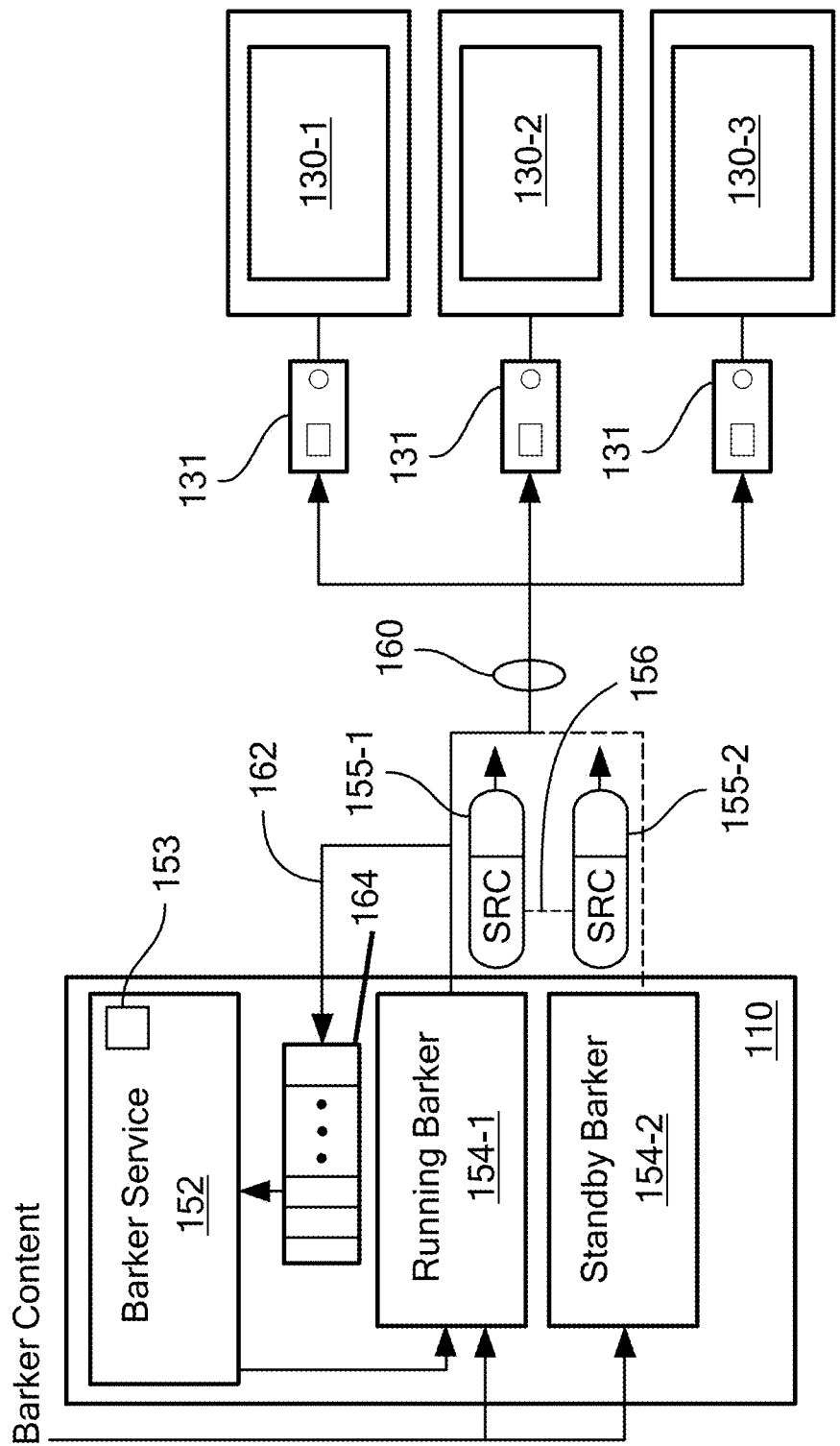
FIG. 2 is a data flow diagram showing distribution of media content in the environment of FIG. 1 according to embodiments herein.

FIG. 2 is a data flow diagram illustrating distribution of barker content in a network environment according to embodiments herein.

Referring to FIGS. 1 and 2, in configurations herein, the data center 110 implements the barker player 114 (such as one or more server resources) to execute or provide a barker service process 152 (distribution of barker media streams).

In one embodiment, the barker service process 152 is operable to invoke at least two barker players (such as server resource 154-1 and server resource 154-2), including a primary (currently rendering) barker server resource 154-1 and a standby barker server resource 154-2 (154 generally).

The barker service 152 represents control of the barker server resources 154 (a.k.a., barker players), and may be implemented in any suitable process arrangement. Note that only one of the barker server resources 154 needs to be actively transmitting streamed content from the barker file 122, which is retrieved from the content repository 120.

The barker server resources 154 (each taking the form or hardware, software instructions, and executed software instructions) are generally similar and differ only by designation of which player is currently transmitting. For example, in one embodiment, one server resource 154-1 is active transmitting the media file 122; the other barker server resource 154-2 is in the standby mode not transmitting the media file 122. The barker service 152 and server resources 154 may be implemented as any suitable arrangement of individual processes (executed software) and/or virtual machine (hardware) arrangement that implements the described operation.

In accordance with further embodiments, the barker service 152 includes control logic 153 for analyzing the transmitted stream 150 (which may be instantiated as a multicast stream 160). The barker service 152 invokes the respective barker player 154-1 to communicate the media file 122 over the multicast link 160. The barker service may be encapsulated in (or integrated with) the processes and hardware denoting the barker server resources 154, or may be implemented in other suitable process arrangement.

As indicated above, substantial overhead is incurred when a conventional, sole barker server resource 114 crashes or is terminated, during which a null signal or "black screen" is rendered on downstream user equipment. In contrast to conventional techniques, in response to detecting a failure associated with the primary (active) barker player 154-1, the barker service 152 as described herein commences transmitting the stream of content 150 (as multicast stream 160) from the second barker server resource 154-2.

In the configurations herein, the packets 155-2 ... 155-2 (155 generally) define the multicast stream 160 from either barker server resource 154-1 or barker server resource 154-2.

In one embodiment, the use of a multicast stream 160 for the barker channel stream 150 allows the stream recipients to continue receiving the same stream content when broadcasted from the standby barker server resource 154-2 during a condition in which the barker server resource 154-1 fails.

In one nonlimiting example embodiment, an IP source address 156 (network address), used to designate the source of the multicast stream 160, is a virtual IP address shared by both barker players 154, so the recipients of the multicast stream 160 continue to receive the stream from a common source even though it is physically switched over to the standby server resource 154-2 during a failure mode in which a failure occurs.

Further in this example embodiment, streamed content 122 (such as video content) in the packets 155 is captured from the downstream side with respect to server resources 154 via a packet sniffer or capture utility, shown by arrow 162.

In one embodiment, captured content (from multicast stream 160) is stored in a feedback buffer or counter 164 for evaluation by the barker service 152 (monitor resource and analyzer resource).

In yet further embodiments, upon instantiation or launch, the barker service 152 (executed software and hardware) joins the multicast stream 162 (i.e. multicast link) to monitor for presence of the stream of content 150. Analyzing the stream of content via the barker service 152 includes receiving a copy or count of the stream of content 150 (data packets in the multicast stream 160) transmitted from the primary (first) server resource 154-1, and comparing the received stream of content transmitted from the primary server resource 154-1 over the multicast stream 160 to a known copy of the stream of content from the barker file 122. Either a content match or packet count may be employed to determine if the data packets in the multicast stream 160 include video content matching the original media file 122.

If the barker service 152 does not observe the proper downstream content from the server resource 154-1, such as zero transmitted packets or erroneous data packets, the barker service 152 (monitor resource and analyzer resource) concludes occurrence of a problem with the primary barker server resource 154-1 and invokes operation of the standby barker server resource 154-2. In such an instance, the standby barker server resource 154-2 now becomes the primary transmitter of the multicast stream 160 while server resource 154-1 operates in a standby mode (or server resource 154-1 just fails and does not operate in any mode at all).

Note that the concept of the barker server resource 154 may be satisfied by any suitable process or dedicated hardware device or processor, so starting and stopping may include commencing or instantiating a physical or virtual device, or merely launching a separate process.

In one embodiment, as previously discussed, the stream of content transmitted on the barker channel 150 (multicast stream 160) generally includes promotional content (or other suitable video) and is adapted for looped rendering to the multiple communication devices such as television screens 130 in conjunction with a rendering of the selection guide 132.

Figure 3:
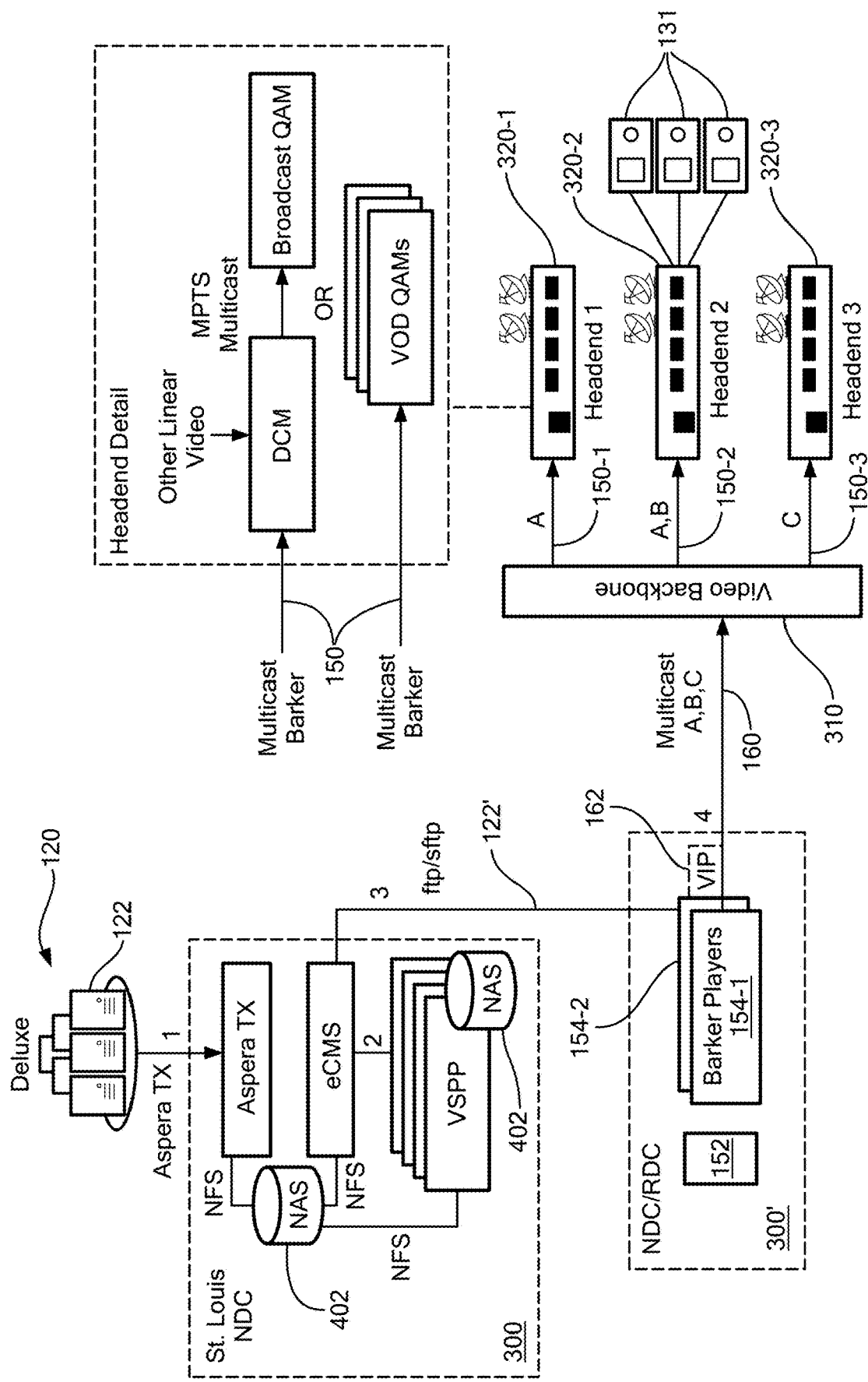
FIG. 3 is a block diagram of the media file rendering system in the environment of FIG. 1 according to embodiments herein.

FIG. 3 is a block diagram of the promotional (barker) file rendering system according to embodiments herein.

Referring to FIGS. 1-3, during implementation, the barker file 122 content is distributed on a large user scale. For example, different user regions represent different deployments of data centers, head ends, set top boxes, etc., that support conveyance of respective content and interface with the television screens 130 or other rendering devices.

Conventional approaches do not deploy systems that can stream multiple different barker video files 122 on multicast streams, update the files when needed, and do so without manual intervention. Further, in the case of licensed barker content, the barker players 154 also need to accommodate an expired license window if a new file is not available.

In accordance with further embodiments, the barker service 152 and related processes include three scripts. For example, in one embodiment, two scripts will look for three different types of barker video files. They will then determine when the barker files need to be played by reading an ADI XML file. They also will determine if the barker streams need to be created or updated and stream the different barkers on their assigned multicast IP and port.

If the barker file 122 has been updated, the old files will be archived in case they are needed. If an updated barker file is not found, the current (or previously selected) barker media file will continue to be played.

A third script controls which of the two servers (server resource 154-1 and server resource 154-2) it is running on is the active barker player. In one embodiment, the third script determines which server owns the virtual IP, and also verifies if any of the barker streams are already being streamed on the network from the other server. It does this by trying to join the different multicast groups of the barker streams and then doing a tcpdump or similar utility to count packets.

As previously discussed, the active barker player 154-1 owns (uses) the source address 156 and will also be transmitting packets 155 receivable by joining the multicast stream 160. This (third) monitoring script will also keep the necessary processes running, the barker files playing, and notify responsible parties if there is an issue. The scripts can be run with or without manual intervention.

In FIG. 3, in one embodiment, a plurality of barker files 122 are employed for providing content for the barker stream 150.

More specifically, the stream of content 150 can be generated to include a plurality of files, each file corresponding to a specific type of the communication devices (set top box) defining the user equipment, and each type adapted to receive a respective barker file. For example, in one embodiment, content A in the multicast stream 160 is first video content for display by a first type of communication device (such as a set top box); content B in the multicast stream 160 is second content for display by a second type of communication device (such as a set top box); etc.

Alternatively, the content A, B, and C simply represents different streams of content.

Further in this example embodiment, each barker file (content such as A, B, and C) has similar promotional content so that the users receive the same barker content regardless of their settop box.

In accordance with further example embodiments, a national or large area data center 300 downloads all versions of the barker file 122 and related scripts from the repository 120. The national data center 300 includes related storage 402 and software for distributing the barker content 122' to local data centers 300' hosting the barker players 154.

As previously discussed, different barker files 122 are needed depending on the type of downstream communication device 131 (such as set top box) deployed to users downstream from a particular headend 320-1 . . . 320-3 (320 generally). The barker service 152 determines, for each headend (such as headend 1, headend 2, headend 3, etc.), a type of the settop box or boxes connected to that headend, and renders the stream of content from one of a plurality of content files based on the type of the communication device 131, shown as content A, B or C.

The multicast stream 160 is sent to a video backbone 310 for each of the 3 types A, B, C, and the video backbone 310 sends 1, 2 or all 3 of the corresponding streams 150-1 . . . 150-3 to the respective headends 1, 2, 3, based on the communication devices 131 they serve.

More specifically, in this example embodiment, the headend 1 receives multicast content A from multicast stream 160 and communicates it downstream to multiple communication devices such as over a first QAM channel; the headend 2 receives multicast content A and content B from multicast stream 160 and communicates it downstream to multiple communication devices such as over a first QAM channel and a second QAM channel; the headend 3 receives multicast content C from multicast stream 160 and communicates it downstream to multiple communication devices such as over a QAM channel; and so on.

Therefore, the local data center 300' receives the content for transmitting as the stream of content 150 from a headend or central office 300 at the upstream side of the distribution system in FIG. 3. The barker server resources 154 transmit the stream of content 150 on a downstream side to the multiple communications devices 131; the barker service 152 analyzes the transmissions on the downstream side via tcpdump or similar utility, shown by arrow 162 in a manner as previously discussed.

Figure 4B:
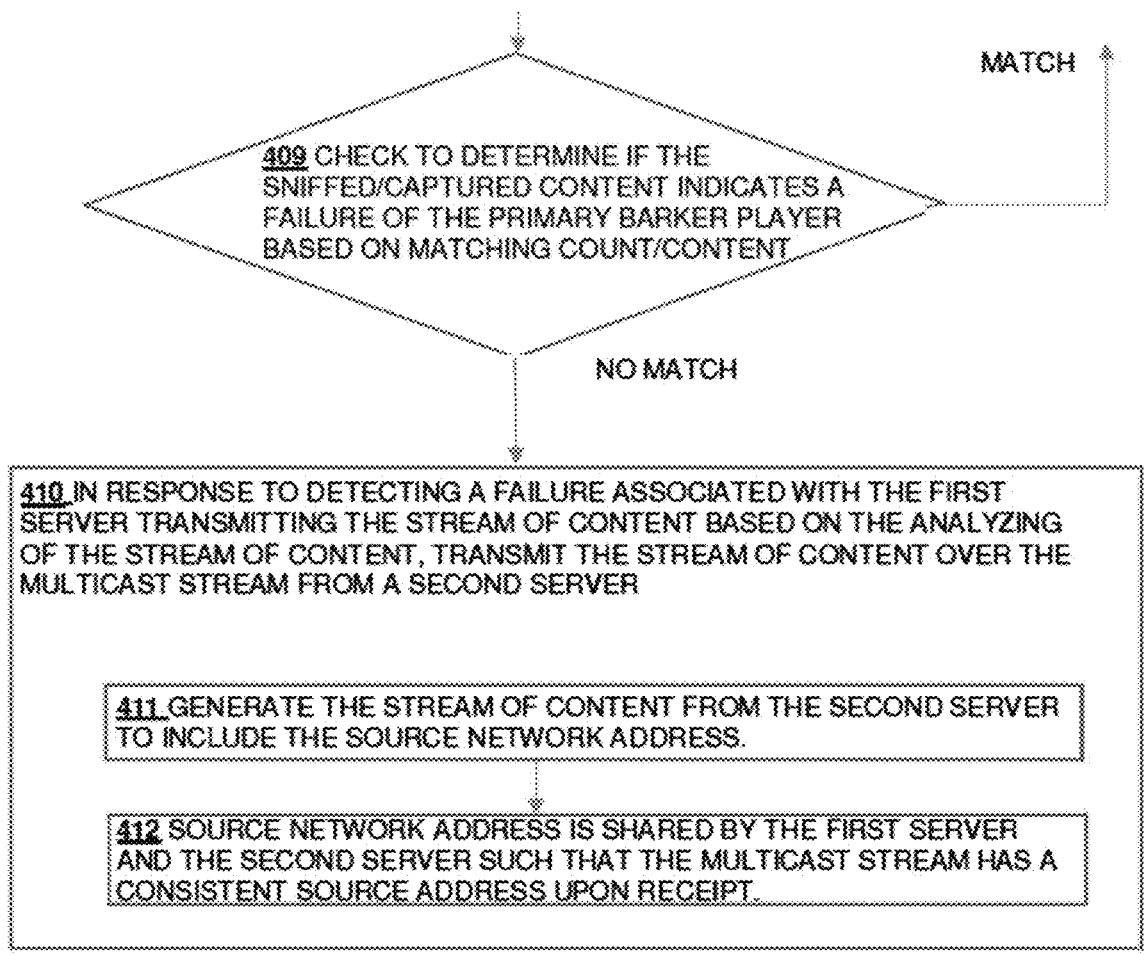

FIGS. 4A-4B are a flowchart of barker file delivery and rendering according to FIGS. 2 and 3. Referring to FIGS. 1-4B, at step 300, the barker service 152 monitors the multicast stream 160 over which the first player (server) 154-1 transmits a stream of content 150 downstream over a communication link through one or more headend resources to multiple communication devices.

The first server 154-1 is assigned a source network address 156 (such as a virtual network address) from which the first server 154-1 transmits the stream of content 122 over the multicast link, as depicted at step 401. In other words, the stream is received as emanating from this address, and the multicast members who have joined this stream will all receive this multicast stream.

The barker service 152 establishes the multicast stream wherein the multicast stream emanates from a source network address and terminates at each of the multiple communication devices. Monitoring the multicast stream by the barker service 152 likewise includes joining the multicast stream to monitor for presence of the stream of content 150, as shown at step 402.

The barker players 154 therefore join, as either the first server 154-1 or the second server 154-2, the multicast stream 160. The communication devices at which the multicast stream is transmitted and terminates include communication devices 131 (such as set top boxes); each of the communication devices is coupled to a visual rendering device 130 of a subscriber for display of rendered content, as depicted at step 403.

Each of the communication devices 131 (such as set top boxes) are adapted to receive a channel selection for directing the rendered content, such that the multicast stream 160 is rendered in conjunction with the channel selection for the program guide 140. Alternatively, certain TVs may embed the settop box capability directly via a card or similar device inserted directly into the TV (so-called "smart TVs).

The barker service 152 analyzes the multicast stream 160 of content transmitted from the first server over the communication link, as depicted at step 404, and continues monitoring as the barker channel 150 (multicast stream 160) is rendered is a play-loop to users selecting the VOD guide 132. In one embodiment, analyzing the stream of content 150 includes establishing a sniffer or packet capture utility for capturing outgoing packets 155 on the multicast stream 160 of content, as shown at step 405. The invoked packet sniffer captures the stream of content 150 (over multicast stream 160) emanating from the first server 154-1, and analyzes the captured packets 155 to determine proper rendering of the stream of content. The barker service therefore receives a copy of the stream of content transmitted from the first server, as shown at step 406.

Alternatively or in addition, maintaining a count of the captured outgoing packets sent on the stream of content, as disclosed at step 407. Detecting the failure of the multicast stream 160 and/or first server resource 154-1 includes detecting that the multicast stream 160 of content transmitted from the first server does not match the copy of the stream of content from the barker file 122, or may merely include counting the packets 155 to identify downstream transmission of the content, and concluding player failure if no packets are emanating downstream. Conventional approaches ensure only operation at the process level, and do not evaluate the effective transmission to the downstream settop boxes by joining and counting packets on the multicast stream. The barker service 152 compares the stream of content transmitted from the first server to the copy of the stream of content for either content or packet count, as shown at step 408.

A check is performed, at step 409, to determine if the sniffed/captured content indicates a failure of the primary barker player (either count or content). If the count and/or content of the packets indicates an active multicast transmission, the barker server resource 154-1 is deemed to be operating correctly, In response to detecting a failure associated with the first server 154-1 transmitting the stream of content based on the analyzing of the stream of content at step 410, the barker service 152 commences transmitting the stream of content over the multicast stream from a second server 154-2 over the communication link. Transmitting the stream of content 150 over the multicast stream 160 from the second server 154-2 (standby barker player 154-2) includes generating the stream of content from the second server to include the source network address 156, as depicted at step 411. The source network address is shared by the first server and the second server so that the multicast stream 160 has a consistent source address upon receipt, as disclosed at step 412. This ensures that the multicast stream emanates from the same source address and downstream joined entities (i.e. settop boxes) are agnostic to the shift in barker players 154.

In particular scenarios, the barker file 122 includes content that is licensed for a period of time from a third party. In the case where the promotional content includes licensed content, upon commencing playing a loop of the promotional content, the barker service 152 verifies a current license for the promotional content. Upon verifying the license and determining a license renewal is needed, the barker players 154 nonetheless continue with the rendering and, rather than terminate, log a notification for license renewal. It is preferable to continue with a delayed license confirmation rather than render a blank screen.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
 monitoring a multicast stream over which a first server transmits a stream of content over a communication link;
 analyzing the stream of content transmitted from the first server over the communication link, and
 in response to detecting a failure associated with the first server transmitting the stream of content based on the analyzing of the stream of content, transmitting the stream of content over the multicast stream from a second server over the communication link;
 wherein monitoring the multicast stream includes joining the multicast stream to monitor for presence of the stream of content, and
 wherein the stream of content is designated for promotional content and adapted for looped rendering to the multiple communication devices in conjunction with a selection guide rendering.

2. The method as in claim 1, wherein analyzing the stream of content includes: receiving a copy of the stream of content transmitted from the first server; and
 comparing the stream of content transmitted from the first server to the copy of the stream of content.

3. The method as in claim 2, wherein detecting the failure includes detecting that the stream of content transmitted from the first server does not match the copy of the stream of content.

4. The method of claim 1, wherein the promotional content includes licensed content, the method further comprising:
 upon commencing a loop of the promotional content, verifying a current license for the promotional content.

5. The method of claim 1 further comprising, upon verifying the license and determining a license renewal is needed, continuing with the rendering and logging a notification for license renewal.

6. The method as in claim 1, wherein the first server is assigned a source network address from which the first server transmits the stream of content over the multicast link; and
 wherein transmitting the stream of content over the multicast stream from the second server includes: generating the stream of content from the second server to include the source network address.

7. The method of claim 1 wherein analyzing the stream of content comprises: establishing a sniffer for capturing outgoing packets on the stream of content; and
 maintaining a count of the captured outgoing packets sent on the stream of content.

8. The method of claim 1 further comprising: establishing the multicast stream, the multicast stream transmitted from a source network address and terminating at multiple downstream devices; and
 joining, from either of the first server or the second server, the multicast stream.

9. The method of claim 8, wherein the source network address is shared by the first server and the second server such that the multicast stream has a same source address regardless of which server resource transmits the multicast stream.

10. The method of claim 8, wherein the multiple downstream devices at which the multicast stream terminates includes a headend in a cable network environment.

11. The method of claim 10, wherein the stream of content is rendered in a content guide.

12. The method of claim 10, wherein the stream of content includes a plurality of files, each file corresponding to a type of the communication devices defining user equipment, each type adapted to receive a respective file, each file having similar promotional content.

13. The method of claim 10 further comprising: determining a type of set top box; and rendering the stream of content from one of a plurality of content files based on the type of the settop box.

14. The method of claim 1 further comprising: receiving the content for transmitting as the stream of content from a headend;
transmitting the stream of content downstream to multiple communications devices; and
analyzing the transmitted stream of content.

15. The method of claim 1 further comprising invoking a packet sniffer for capturing the stream of content emanating from the first server, and analyzing the captured packets to determine proper rendering of the stream of content.

16. The method of claim 1 wherein analyzing the stream of content includes counting the packets to identify downstream transmission of the content; and concluding failure of the first if no packets are emanating downstream over the communication link.

17. A video network device, comprising:
a plurality of servers for alternately transmitting a multicast stream of content downstream over a communication link to multiple communication devices;
a service operable to monitor the multicast stream over which a first server transmits a stream of content downstream over the communication link to multiple communication devices,
control logic operable to analyze the stream of content transmitted from the first server over the communication link, the control logic, in response to detecting a failure associated with the first server transmitting the stream of content based on the analyzing of the stream of content, operable to commence transmission of the stream of content over the multicast stream from a second server over the communication link;
an interface to the downstream communication devices for rendering the stream of content in conjunction with a program guide channel and
wherein the service joins the multicast stream to monitor for presence of the stream of content; and
wherein the stream of content is designated for promotional content and adapted for looped rendering to the multiple communication devices in conjunction with a selection guide rendering.

18. The device as in claim 17, wherein the service receives a copy of the stream of content transmitted from the first server; and the control logic compares the stream of content transmitted from the first server to the copy of the stream of content.

19. The device as in claim 18, wherein detecting the failure includes detecting that the stream of content transmitted from the first server does not match the copy of the stream of content.

20. The device as in claim 17 further comprising:
a common source address, the first server is assigned the source network address from which the first server transmits the stream of content over the multicast link; and
wherein the second server generates the stream of content to include the source network address.

21. The device as in claim 17 further comprising:
a sniffer operable to capture outgoing packets on the stream of content, and a buffer operable to maintain a count of the captured outgoing packets sent on the stream of content.

22. The device as in claim 17, wherein the multicast stream emanates from a source network address and terminates at each of the multiple communication devices; and
wherein barker service joins, from either of the first server or the second server, the multicast stream.

23. Computer-readable storage hardware having instructions stored thereon, the instructions, when carried out by computer processor hardware, cause the computer processor hardware to:
monitor a multicast stream over which a first server transmits a stream of content downstream over a communication link to multiple communication devices;
analyze the stream of content transmitted from the first server over the communication link, and
in response to detecting a failure associated with the first server transmitting the stream of content based on the analyzing of the stream of content, transmit the stream of content over the multicast stream from a second server over the communication link;
wherein monitoring the multicast stream includes joining the multicast stream to monitor for presence of the stream of content, and
wherein the stream of content is designated for promotional content and adapted for looped rendering to the multiple communication devices in conjunction with a selection guide rendering.

* * * * *